C. E. MINCER.
MIXING TANK.
APPLICATION FILED JUNE 7, 1912.

1,060,479.

Patented Apr. 29, 1913.
2 SHEETS—SHEET 1.

WITNESSES

INVENTOR
Charles E. Mincer
BY
ATTORNEYS

C. E. MINCER.
MIXING TANK.
APPLICATION FILED JUNE 7, 1912.

1,060,479.

Patented Apr. 29, 1913.
2 SHEETS—SHEET 2.

WITNESSES
G. Robert Thomas
J. L. McAuliffe

INVENTOR
Charles E. Mincer
BY Munn & Co
ATTORNEYS

UNITED STATES PATENT OFFICE.

CHARLES EDWARD MINCER, OF HAMBURG, IOWA.

MIXING-TANK.

1,060,479.

Specification of Letters Patent. Patented Apr. 29, 1913.

Application filed June 7, 1912. Serial No. 702,327.

*To all whom it may concern:*

Be it known that I, CHARLES E. MINCER, a citizen of the United States, and a resident of Hamburg, in the county of Fremont and State of Iowa, have invented a new and Improved Mixing-Tank, of which the following is a full, clear, and exact description.

My invention is intended more particularly for the mixing of Bordeaux solution for use in spraying orchards, vineyards and field crops. It is customary in using Bordeaux solution or like spraying mixtures in large quantities, to have a plurality of tanks, generally three, for the preparation of the separate ingredients entering into the mixture, and the bringing together of the separate preparations. It is necessary in orchards and large fields either to have sets of tanks at various points for replenishing the sprayer, or else to drive back a considerable distance to the one point of supply.

My invention provides for effecting the desired mixture in the tank of the wheeled sprayer, whereby it is necessary only to have barrels of stock solution at points in the orchard or field where water is available, thereby doing away with the expensive and cumbersome fixed series of tanks.

The distinguishing features of my invention and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1:
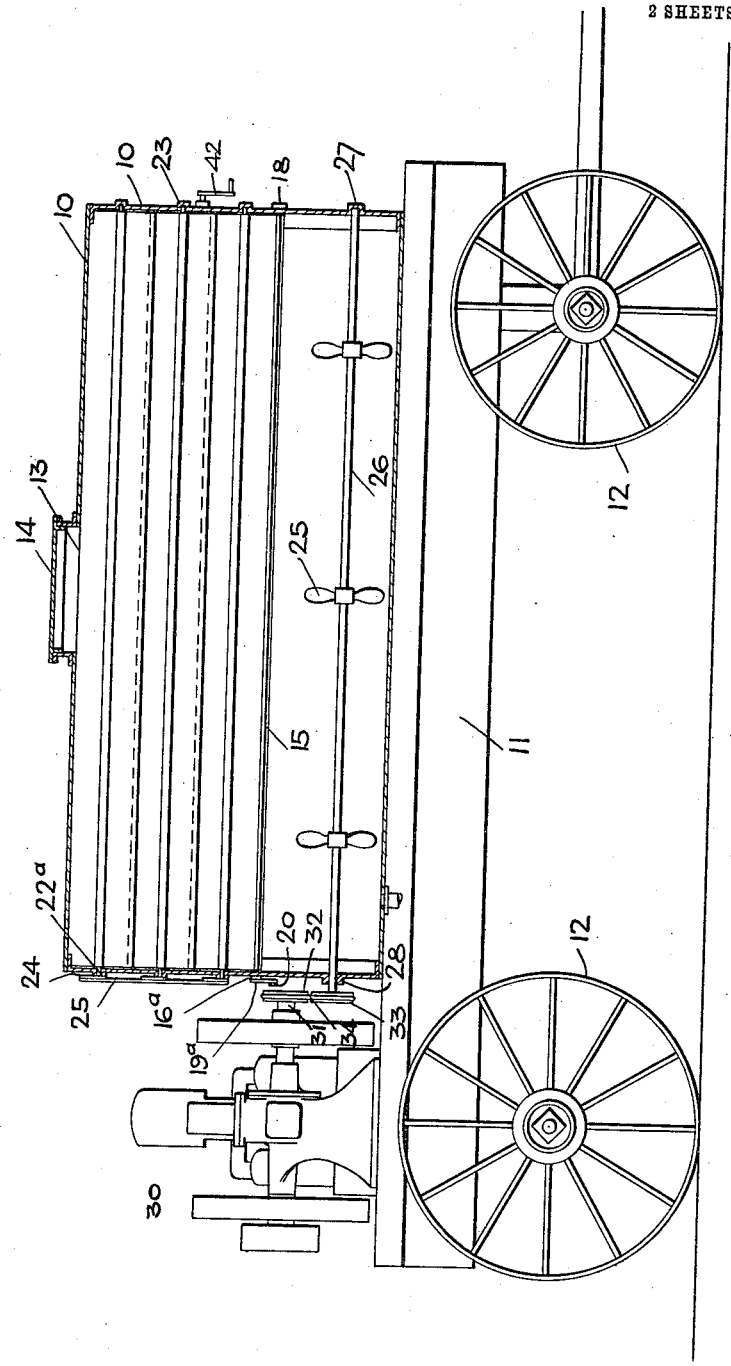
Figure 2:
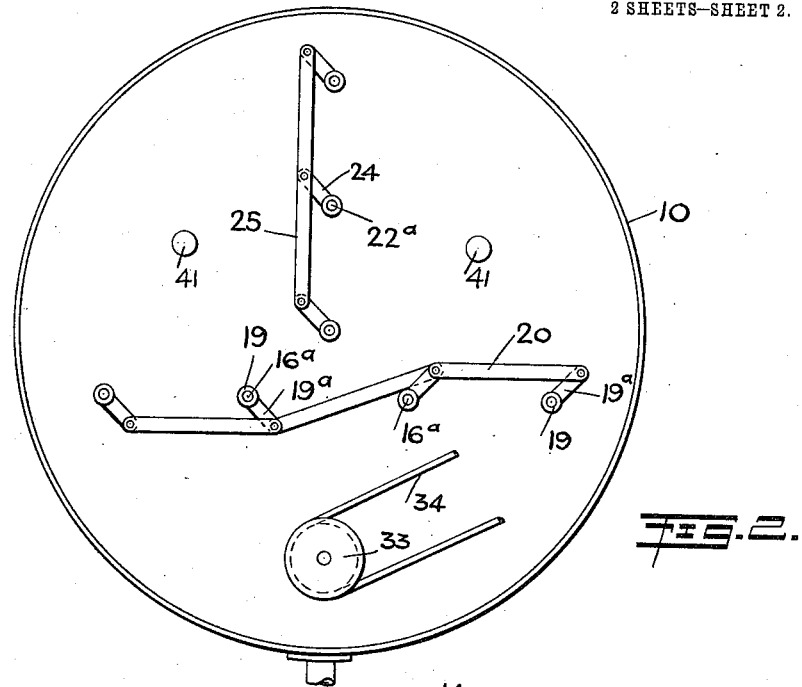
Figure 3:
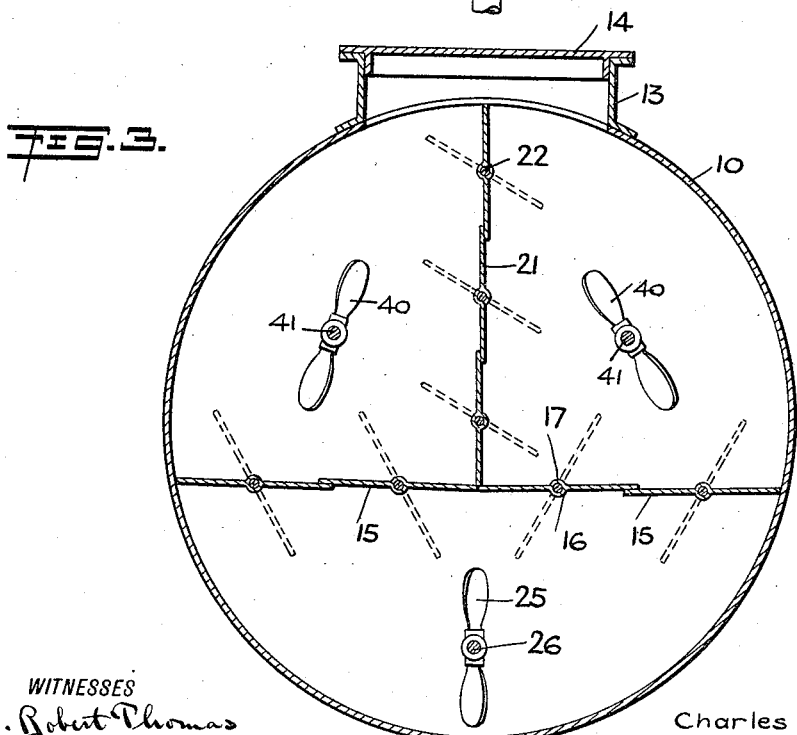

Figure 1 is a side elevation of a wheeled sprayer showing my improved tank in longitudinal section; Fig. 2 is an end view of the tank, and Fig. 3 is a cross section thereof.

A practical embodiment of my invention comprises any approved form of tank or container 10, which in the present instance is shown mounted on and extending longitudinally of a truck 11 mounted on running wheels 12, but it will be understood that any container may be employed. The tank is provided with an inlet 13 and a cover 14 therefor. Within the tank movable partitions are arranged dividing the interior into a plurality of compartments. In the present instance, the partitions range longitudinally of the tank and are so disposed as to form three compartments running lengthwise. Thus a horizontal series of partition sections 15 are mounted on longitudinal rods or rock shafts 16 to rock in the vertical plane, said rock shafts 16 being secured in any suitable manner at about the transverse center of the partitions, as by hubs 17, and said rods have bearings in the ends of the tank, formed in any suitable manner, as in front bearings 18 and rear bearings 19. The shafts 16 are provided with any approved device for rocking the same. In the illustrated example, the rear ends of the shafts are extended through the end of the tank 10, as at 16$^a$, and the outer ends of the several shafts are provided with arms 19$^a$, the several arms being connected by links 20, so that the links may be grasped to turn the rods for tilting the partition sections 15. In the closed position illustrated in full lines in Fig. 3, the partition sections 15 divide the tank into upper and lower divisions or compartments, the upper division desirably being the larger. I divide the upper division of the tank into two compartments by providing a vertical series of partition sections 21 mounted on rock shafts 22 having suitable bearings in the ends of the tank, the front bearings being indicated at 23 in Fig. 1. At the rear ends, the rock shafts 22 are extended through the tank, as at 22$^a$, and the extended ends carry arms 24 connected by a link 25 for the tilting of the partition sections 21 simultaneously. It will be seen from Fig. 3 that the partition sections 15 and 21 may be rocked from the positions shown in full lines to the tilted positions shown in dotted lines.

With the partitions in the closed position, the tank is divided into three compartments, and in practice when the partitions are closed, the tank is filled with water to the top. On one side of the vertical partitions formed by the closed sections 21, the stock solution of lime is added, if Bordeaux mixture is employed. On the other side of the vertical partition, a copper sulfate solution is added to the water and stirred, the partition sections being sufficiently tight for the purpose. An additional insecticide of any approved character may be added to either side of the vertical partition, or may be added later on. To stir the solutions in the upper compartments a mechanical stirrer is preferably employed, for which purpose I may make use of stirring blades 40 on shafts 41. Each shaft is provided with any suitable operating means, as for instance, a crank handle 42, and has suitable bearings in the heads of the tank. The lime and copper sulfate solutions having been properly prepared in the two upper compartments of the tank, both the horizontal and vertical partition sections are tilted to the position shown in dotted lines, and agitation of the mixture is produced by a mixing device which, as illustrated, consists of a series of propeller blades 25 mounted on a shaft 26, having suitable bearings in the front and rear of the tank, as at 27, 28. The agitator shaft 26 is driven in any suitable manner, either by power or by hand. In the illustrated form, an engine and appurtenances are shown conventionally, as at 30, a driving connection between the engine shaft 31 and the shaft 26 being obtained by pulleys 32, 33 on the respective shafts and a belt 34. The rotation of the shaft 26 and its agitating blades 25 causes a continuous circulation of the mixture through the tank so as to effect a complete mixing.

It will be understood that my invention is not limited to the specific form of the partition sections, the special disposition of the partitions into horizontal and vertical series shown, nor to the particular means for opening and closing the partition sections, as the minor features may be varied without departing from the essential features.

Having thus described my invention, I claim as new and desire to secure by Letters Patent:

1. The combination with a horizontal mixing tank having an inlet opening at the top for materials, of a horizontal partition dividing the tank into upper and lower divisions, and a vertical partition dividing the upper division of the tank into compartments, said vertical partition extending across the opening in the tank, and means for opening the partitions to establish communication between the several divisions and compartments of the tank.

2. A mixing tank disposed horizontally and having an inlet-opening at the top, partition sections dividing the tank into longitudinally ranging compartments, there being a vertical series of said partition sections extending across the inlet opening, and the tank being provided with a longitudinally ranging stirrer shaft at each side of the vertical partition sections, the said sections being pivotally mounted on horizontal axes and rockable to closed and open positions.

3. A mixing tank consisting of a single unit comprising a horizontally disposed shell extending continuously in closed form, the upper side of the shell having an inlet-opening and there being a suitable outlet opening, means within the shell and ranging longitudinally thereof to form compartments therein, said means including a vertical series of longitudinally ranging partition sections rockable on horizontal axes to closed and open positions, and an agitator shaft disposed at each side of the vertical partition sections.

In testimony whereof I have signed my name to this specification in the presence of two subscribing witnesses.

CHARLES EDWARD MINCER.

Witnesses:
 E. M. FISHER,
 L. A. REES.

---

Copies of this patent may be obtained for five cents each, by addressing the "Commissioner of Patents, Washington, D. C."